United States Patent
Hays

(10) Patent No.: US 6,651,160 B1
(45) Date of Patent: Nov. 18, 2003

(54) REGISTER SET EXTENSION FOR COMPRESSED INSTRUCTION SET

(75) Inventor: W. Patrick Hays, Cambridge, MA (US)

(73) Assignee: MIPS Technologies, Inc., Mountain View, CA (US)

(*) Notice: Subject to any disclaimer, the term of this patent is extended or adjusted under 35 U.S.C. 154(b) by 568 days.

(21) Appl. No.: 09/654,064

(22) Filed: Sep. 1, 2000

(51) Int. Cl.[7] .................................................. G06F 9/32
(52) U.S. Cl. ..................................... 712/210; 711/220
(58) Field of Search ................................ 712/210, 211; 711/2, 220

(56) References Cited

U.S. PATENT DOCUMENTS

| | | | | |
|---|---|---|---|---|
| 5,666,510 A | * | 9/1997 | Mitsuishi et al. ........... | 711/220 |
| 6,230,259 B1 | * | 5/2001 | Christie et al. ............. | 712/228 |
| 6,349,380 B1 | * | 2/2002 | Shahidzadeh et al. ...... | 712/211 |
| 6,574,722 B2 | * | 6/2003 | Utsumi ....................... | 711/211 |

* cited by examiner

*Primary Examiner*—Eric Coleman
(74) *Attorney, Agent, or Firm*—Fish & Richardson P.C.

(57) ABSTRACT

Systems and methods for extending register addresses in compressed instruction sets are capable of executing extended register instructions that supplement the bits needed to address registers. The extended register instruction precedes corresponding standard instruction, and register the bits from the extend instruction are combined with register bits from the standard instruction to obtain a longer register address.

22 Claims, 3 Drawing Sheets

REGISTER SET EXTENSION FOR COMPRESSED INSTRUCTION SET

I. BACKGROUND OF THE INVENTION

This invention relates generally to the field of reduced instruction set computing, and more specifically to the field of referencing registers in a compressed instruction set.

Reduced instruction set computer (RISC) architectures provide several advantages for programmable processors over traditional complex instruction set (CISC) architecture such as reducing complexity and increasing the speed of operations. However, RISC architectures suffer at least one drawback. The instruction density after compilation (bytes of object code) is often larger than the same program would be after compilation for a CISC architecture. This problem becomes more significant when incorporating RISC architectures, together with their instruction caches, into system-on-chip (SoC) designs. The added cost of larger on-chip memories can pose a serious problem in these cost-sensitive designs. In fact, the code sizes of 32-bit RISC instruction sets for DSP applications compares are often larger than those achieved by older DSP architectures with specialized 16-bit instruction sets.

The MIPS® RISC architecture uses a standard 32-bit MIPS instruction set together with the MIPS 16 "Application Specific Extension," an alternative 16-bit instruction set to improve code density. Programs can include sections of contiguous instructions encoded with MIPS 16 and sections of contiguous instructions encoded with 32-bit MIPS instructions. Shortening the instructions from 32-bits to 16-bits required removing some opcodes, shortening the immediate and displacement fields and supporting a smaller register set. Each of these changes results in potential problems that need to be addressed.

The absent opcodes in MIPS 16 are rarely used in application code (as opposed to kernel code) and have little effect on overall code density. The problem of shortened immediate and displacement fields is mitigated by the "EXTEND" opcode, which allows full size fields to be provided within MIPS16 at the cost of two 16-bit MIPS16 instructions. Two instructions are used to provide space for the full immediate or displacement values. This is more efficient than switching modes to 32-bit MIPS instructions to execute an instruction with larger immediate or displacement.

One response to the problem of having a smaller register set addressable within MIPS16, is the MIPS16 MOVE instruction, which allows the full register set to be accessed within MIPS16. The 32-bit MIPS instruction allows for addressing thirty-two registers using a 5-bit field. The 16-bit instructions allow for addressing a maximum of 8 registers using a 3-bit field. The MOVE instruction provides access to the other 24 registers by moving data to one of eight MIPS16 registers before the operation is performed. Resultant data may then be moved from one of the eight registers to one of the other twenty-four registers. This requires not only moving data from, for example, register 22 to register 2, but also requires storing the register 2 data somewhere so that the register 2 data may be restored after the operation is complete.

Consider the following MIPS-I instruction: add r20, r21, r22. This instruction requires adding the contents of r21 and r22 and placing the result in r20. For MIPS16, the worst-case scenario is eight instructions:

| | |
|---|---|
| store r1 to stack | saving r1 data for restoring later |
| store r2 to stack | saving r2 data for restoring later |
| move r21 to r1 | moving r21 data to r1 |
| move r22 to r2 | moving r22 data to r2 |
| add r1, r1, r2 | adding r1 and r2 and placing the result in r1 |
| move r1 to r20 | moving the result in r1 to r20 |
| load r1 from stack | restoring the contents of r1 |
| load r2 from stack | restoring the contents of r2 |

Compilers can avoid this inefficiency by restructuring code, but this restructuring may prevent other optimizations.

Therefore, there is a need for addressing additional registers in compressed instruction set systems.

II. SUMMARY OF THE INVENTION

The present invention allows for addressing additional registers in a compressed instruction set by concatenating information in two instructions.

A method consistent with the present invention includes the steps of reading a first instruction, determining whether the first instruction is an extend register instruction, reading a second instruction, and concatenating bits in the first instruction with bits in the second instruction when the first instruction is an extend register instruction.

A processor consistent with the present invention includes a set of registers, each register having an address, instruction storage, and an instruction decoder including structure for reading a first instruction from the instruction storage, structure for determining whether the first instruction is an extend register instruction, structure for reading a second instruction from the instruction storage, and structure for concatenating bits in the first instruction with bits in the second instruction when the first instruction is an extend register instruction.

Another processor consistent with the present invention is configured to perform instructions. The instructions include a first instruction having an opcode identifying an extend register instruction, a first register extension with two bits of data, and a second register extension with two bits of data, and a second instruction having first register address with three bits of data, and second register address with three bits of data.

A computer readable memory consistent with the present invention has an instruction comprising an extend register opcode, a first source register extension, and a destination register extension.

Another computer readable memory consistent with the present invention has an extend register opcode, a first source register extension, and a second source register extension.

Another computer readable memory consistent with the present invention has an extend register opcode, a first source register extension, a second source register extension, and a complete destination register extension.

III. BRIEF DESCRIPTION OF THE DRAWINGS

The accompanying drawings, which are incorporated in and constitute a part of this specification, illustrate one embodiment of the invention and, together with the description, serve to explain the objects, advantages, and principles of the invention. In the drawings.

IV. DETAILED DESCRIPTION OF THE PREFERRED EMBODIMENTS

Reference will now be made in detail to embodiments consistent with this invention that are illustrated in the accompanying drawings. The same reference numbers in different drawings generally refer to the same or like parts.

Compressed instruction set systems, such as MIPS16, do not allow accessing more than eight registers because a limited number of bits in each instruction can be used for entering a register address. Systems and methods consistent with the present invention can provide for extend register instructions that supplement the bits needed to address additional registers. For example, a MIPS16 instruction provides three bits of register address. Systems and methods consistent with the present invention, however, can allow for additional bits, such as two additional bits, of register address to arrive at a full five bit address allowing access of all thirty- two registers.

Figure 1:
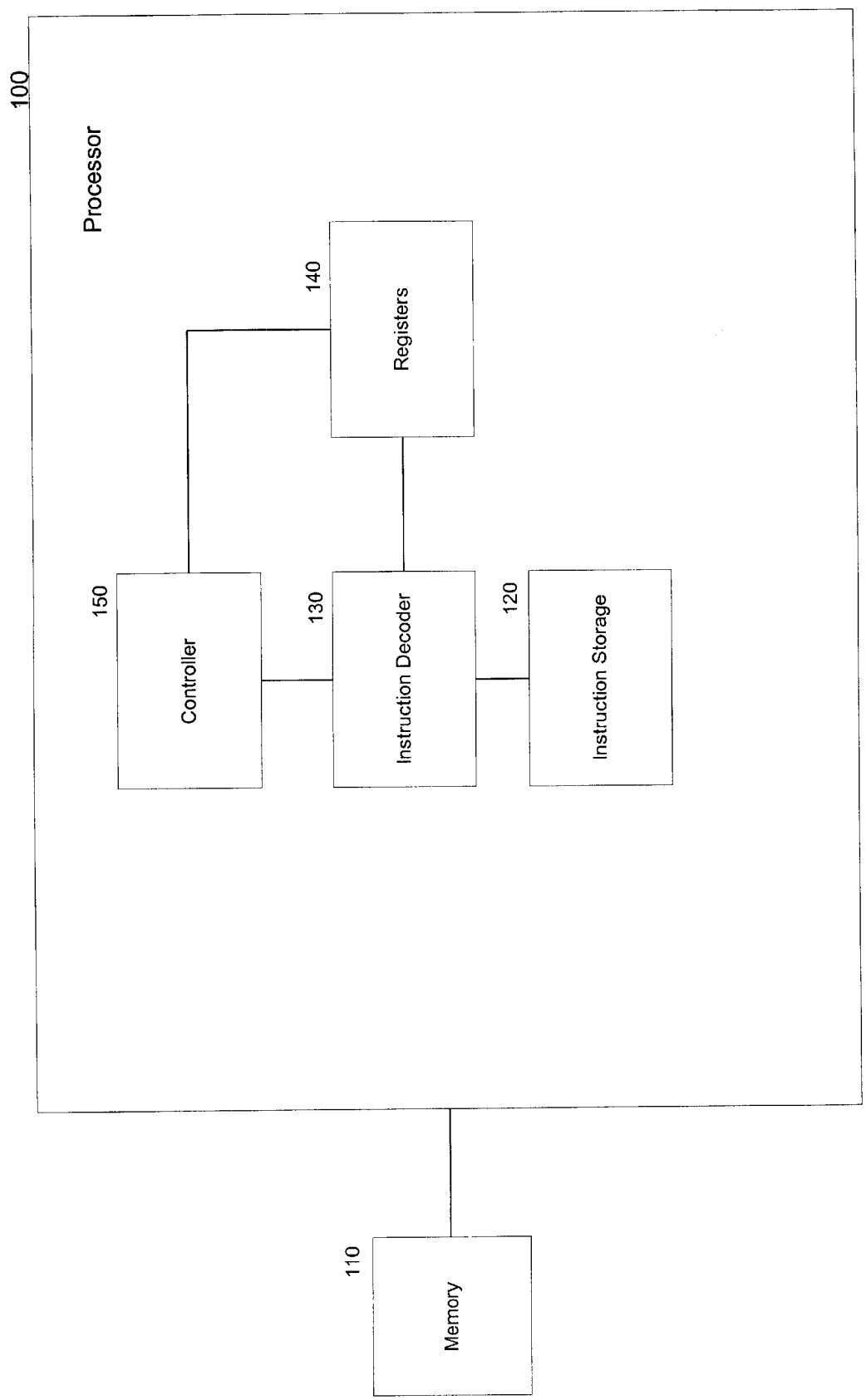
FIG. 1 is a block diagram of a processor and memory consistent with the present invention.

FIG. 1 shows a computer system consistent with the present invention. Processor 100, preferably a RISC processor, is connected to memory 110. Processor 100 includes instruction storage 120, instruction decoder 130, registers 140 and controller 150. Instructions are stored in instruction storage 120 in a compressed format, such as a 16-bit MIPS16 instruction format. Instruction decoder 130 reads the instructions from storage 120 and parses the memory to read and analyze the opcode and operands. Instruction decoder 130, via controller 150, performs the operations directed by the opcode using and storing data in registers 140. There are additional parts to the processor that are not shown.

Figure 2A:
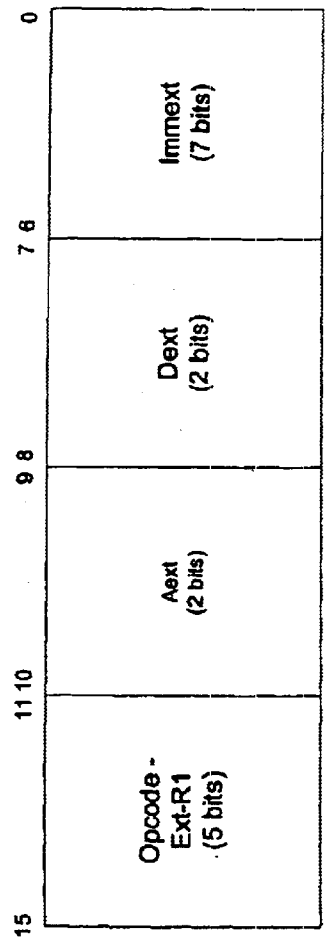
FIGS. 2a–2c are diagrams of extend register instructions consistent with the present invention.
Figure 2B:
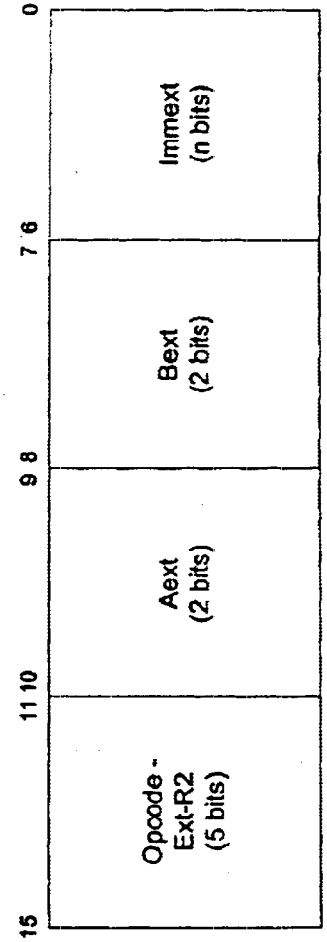
Figure 2C:
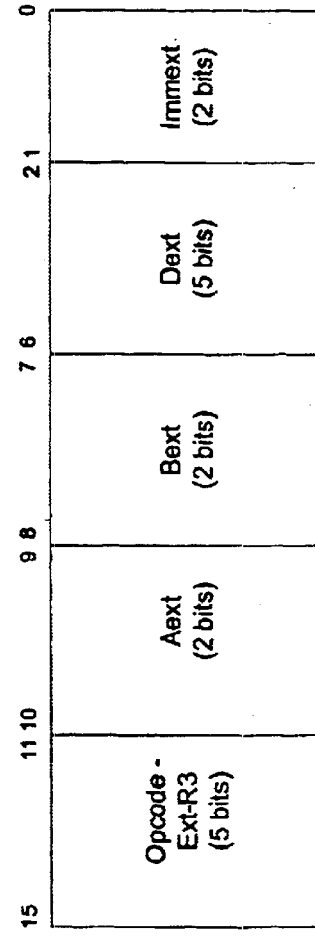

Systems and methods consistent with the present invention can allow for a set of instructions that extend the register set accessible within a compressed instruction set such as MIPS16. FIGS. 2a–c show three instructions that enable extending the register set to all thirty-two general registers and that should precede an instruction, such as a MIPS16 instruction, to be extended. Using the MIPS16 example, if five register bits are needed to address a register then the register extend instruction provides two bits, and in the regular instruction provides the other three (e.g., bottom) bits. The bits from the two instructions are concatenated to provide a full five-bit address.

FIG. 2a is a diagram of an EXT-R1 instruction, which extends a source address, and a destination address, and allows the remaining bits to be used for an immediate field extension, which is a number field. Aext is a two-bit extension to the A-source register address, Dext is a two-bit extension to the destination address, and Immext is an extension to the immediate field. This instruction precedes an instruction that references a source register A and as destination register D, where at least one of the two registers require five bits to address. For example, if source A is register 22, the binary code for "22" is 10110. The Aext field of the EXT-R1 instruction would provide the top two bits, "10," the compressed instruction format and the following instruction that could be a standard instruction with the bottom three bits "1100." Instruction decoder 130 would concatenate the two A fields together to obtain "10110," which would reference register 22.

FIG. 2b is a diagram of an EXT-R2 instruction, which extends two source registers A and B, and allows the remaining bits to be used for an immediate field extension. Aext is a two-bit extension to the A-source register address, Bext is a two-bit extension to the B-source register address, and Immext is an extension to the immediate field. The EXT-R2 instruction would provide the top two bits of the five bits that address the A and B registers, while the next instruction would provide the bottom three bits. The bits not used for the operand or address extensions in EXT-R2 instruction may be used for other data, such as to extend the immediate of the instruction to follow.

FIG. 2c is a diagram of an EXT-R3 instruction, which extends two source addresses, provides a full destination address, and allows the remaining bits to be used for an immediate field extension. Aext is a two-bit extension to the A-source register address, Bext is a two-bit extension to the B-source register address, Dext is a full five-bit destination address, and Immext is an extension to the immediate field. Most MIPS16 instruction formats do not have space for two source addresses and a destination address. Therefore, the result of a MIPS16 function is placed in one of the source registers. The EXT-R3 instruction extends the source addresses A and B for the instruction to follow, and provides a full five-bit address for the destination address.

The bits not used for the operand or address extensions in EXT-R1, R2, and R3 instructions may be used for other data, such as to extend the immediate of the instruction to follow. The number of bits used to extend the immediate may vary.

The example MIPS-I instruction described in the Background of the Invention required a worst-case of eight instructions using MIPS16 ASE. Using the EXT-R instructions of the present invention reduces the eight-instructions to the following two instructions:

EXT-R3 add r20, r21, r22.

This instruction requires adding the contents of r21 and r22 and placing the result in r20. The object code for r20 is 10100, for r21 is 10101 and for r22 is 10110. The Ext-R3 instruction holds the EXT-R3 opcode, the first two bits (10) of r21, the first two bits (10) of r22, and all five bits (10100) of r20. The add instruction holds the add opcode, the bottom three bits (101) of r21 and the bottom three bits (110) of r22.

MIPS16 specifies all encodings of the major opcode field, bits 11–15, but there are several ways to introduce the EXT-R formats into the MIPS16 environment. First, for processors that do not use 64-bit data paths, some opcodes that will not be used, including load double word LD, store double word SD, load word unsigned LWU, and I64, so the new opcodes EXT-R1, EXT-R2, EXT-R3 can be substituted for these opcodes.

Alternatively, if only one opcode is available for replacement, then one opcode must accommodate the three EXT-R instructions. This is done by using two bits of the immediate extension field to designate which EXT-R instruction, R1, R2, or R3, is currently being executed. The 16-bit Ext-R instructions would appear as follows:

R-Ext opcode(5 bits) Aext(2 bits) Dext(2 bits) Immext(5 bits) Ext-R1 (2 bits-00);

R-Ext opcode(5 bits) Aext(2 bits) Bext(2 bits) Immext(5 bits) Ext-R2 (2 bits-01); and R-Ext opcode(5 bits) Aext(2 bits) Bext(2 bits) Dext(5 bits) Ext-R3 (2 bits-10).

For implementations that include 64-bit data path, implementations can introduce EXT-R formats by modifying, rather than eliminating, one of the major opcodes. For example, load immediate LI is encoded as 01101 rx(3) immed(7:0). Immediate fields greater than eight bits require EXTEND. If the encoding is modified so that immediate fields greater than six bits require extend, then the LI opcode can be used to represent the load immediate instruction as well as the three register extend instructions by using 2 of the immediate bits to distinguish between the instructions. The resulting 16-bit instructions would appear as follows:

01101 rx(3 bits) Immed(6 bits) LI(2 bits-00);

01101 Aext(2 bits) Dext(2 bits) Immextl(5 bits) EXT-R1(2 bits-01);

01101 Aext(2 bits) Bext(2 bits) Immextl(5 bits) EXT-R2(2 bits-10); and

01101 Aext(2 bits) Bext(2 bits) Dext(5 bits) EXT-R3(2 bits-11).

Following an EXT-R instruction, the extensions to the register address and immediate fields for the following instruction would be concatenated together taking into account associated valid bits.

Figure 3:
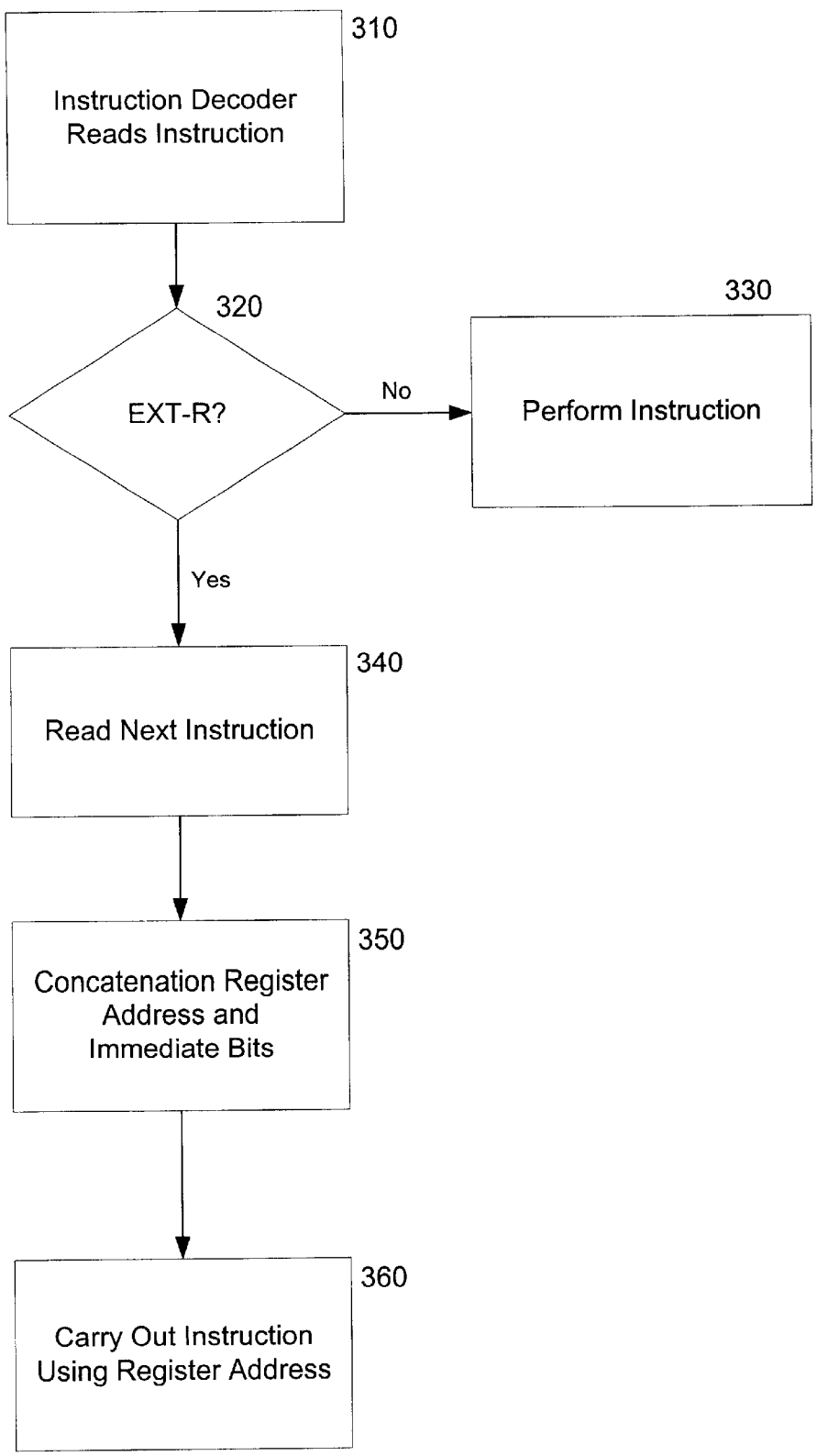
FIG. 3 is a flowchart showing the steps for processing extend register instructions consistent with the present invention.

Flowchart 300 in FIG. 3 shows steps for processing the EXT-R instructions. First, instuction decoder 130 reads an instruction from instruction storage 120 (step 310), and determines whether the instruction is an extend register instruction (step 320). If not, instruction processing continues as usual (step 330). If the instruction is an extend register instruction then the extend register instruction is stored and instruction decoder 130 reads the next instruction (step 340). Instruction decoder 130 concatenates register address bits and immediate bits from the extend register instruction and the regular instruction (step 350). The regular instruction is carried out using the concatenated register address (step 360).

The following charts show MIPS16 opcodes and the register extend instructions that may accompany each instruction. This chart shows MIPS16 instructions that may require extension to address field, register address field and extension to the immediate using the EXT-R1 instuction shown in FIG. 2a.

| MIPS16 | OPCODE | A | B | D | Immediate | Comments |
|---|---|---|---|---|---|---|
| lb,lbu | ry,#(rx) | 2 | — | 2 | 11 | |
| lh,lhu | ry,#(rx) | 2 | — | 2 | 10 | |
| lw | ry,#(rx) | 2 | — | 2 | 9 | |
| lw | rx,#(pc) | — | — | 2 | 9 | |
| addiu | ry,rx,# | 2 | — | 2 | 12 | |
| addiu | rx,pc,# | — | — | 2 | 6 | |
| li | rx,immed | — | — | 2 | 8 | |
| slti | rx,# | 2 | — | — | 8 | D ext. avail also |
| sltiu | rx,# | 2 | — | — | 8 | D ext. avail also |
| cmpi | rx,# | 2 | — | — | 8 | D ext. avail also |
| beqz | rx,immed | 2 | — | — | 8 | ry operand not available |
| bnez | rx,immed | 2 | — | — | 8 | ry operand not available |

The following chart shows MIPS16 instructions that may require extension to the A-register address field, B-register address field, and immediate using the EXT-R2 instruction shown in FIG. 2b.

| MIPS16 | OPCODE | A | B | D | Immediate | Comments |
|---|---|---|---|---|---|---|
| sb | ry,#(rx) | 2 | 2 | — | 11 | |
| sh | ry,#(rx) | 2 | 2 | — | 10 | |
| sw | ry,#(rx) | 2 | 2 | — | 9 | |

The following chart shows MIPS16 instructions that may require extension to the register file, A-register field, B-register field, a full D-address and extension to the immediate using the EXT-R3 instruction shown in FIG. 2c.

| MIPS16 | OPCODE | A | B | D | Immediate | Comments |
|---|---|---|---|---|---|---|
| sllv | ry,rx | 2 | 2 | 5 | — | 2 --> 3 operand |
| srlv | ry,rx | 2 | 2 | 5 | — | 2 --> 3 operand |
| srav | ry,rx | 2 | 2 | 5 | — | 2 --> 3 operand |
| mult | rx,ry | 2 | 2 | — | — | |
| multu | rx,ry | 2 | 2 | — | — | |
| div | rx,ry | 2 | 2 | — | — | |
| divu | rx,ry | 2 | 2 | — | — | |
| mfhi | rx | — | — | 2 | — | |
| mflo | rx | — | — | 2 | — | |
| neg | rx,ry | 2 | 2 | 5 | — | 2 --> 3 operand |
| and | rx,ry | 2 | 2 | 5 | — | 2 --> 3 operand |
| or | rx,ry | 2 | 2 | 5 | — | 2 --> 3 operand |
| xor | rx,ry | 2 | 2 | 5 | — | 2 --> 3 operand |
| not | rx,ry | 2 | 2 | 5 | — | 2 --> 3 operand |
| cmp | rx,ry | 2 | 2 | 5 | — | 2(r24) --> 3 operand |
| slt | rx,ry | 2 | 2 | 5 | — | 2(r24) --> 3 operand |
| sltu | rx,ry | 2 | 2 | 5 | — | 2(r24) --> 3 operand |
| jr | rx | 2 | — | — | — | |
| jalr | ra,rx | 2 | — | 5 | — | |
| addu | rz,rx,ry | 2 | 2 | 2 | — | |
| subu | rz,rx,ry | 2 | 2 | 2 | — | |
| slti | rx,# | 2 | — | 5 | — | (I ext. also avail for immed) |
| sltiu | rx,# | 2 | — | 5 | — | (I ext. also avail for immed) |
| cmpi | rx,# | 2 | — | 5 | — | (I ext. also avail for immed) |
| sll | rx,ry,# | 2 | 2 | 5 | 2 | shamt 3b --> 5b |
| srl | rx,ry,# | 2 | 2 | 5 | 2 | shamt 3b --> 5b |
| sra | rx,ry,# | 2 | 2 | 5 | 2 | shamt 3b --> 5b |

The following chart includes MIPS16 opcodes for which the extend register instructions will not be needed. As noted other fields may be extended instead.

| MIPS16 | OPCODE | A | B | D | Immediate | Comments |
|---|---|---|---|---|---|---|
| jal | target | | | | | no register fields |
| jalx | target | | | | | no register fields |
| jr | ra | 5 | — | — | — | "jr rx" is extended instead |
| break | immed | | | | | no register fields |
| b | immed | 5 | 5 | — | 5 | no register fields |
| bteqz | immed | 5 | 5 | — | 8 | this op not needed |
| btnez | immed | 5 | 5 | — | 8 | this op not needed |
| LW-SP | | 5 | — | 2 | 6 | LW is extended instead |
| SW-SP | | 5 | 2 | — | 6 | SW is extended instead |
| SW | ra,#(sp) | 5 | 5 | — | 6 | SW is extended instead |

-continued

| | | Number of bits that may be needed in alternative extend instruction | | | | |
|---|---|---|---|---|---|---|
| MIPS16 | OPCODE | A | B | D | Immediate | Comments |
| addiu | sp,# | 5 | — | 5 | 5 | "addiu ry,rx,#" is extended instead |
| move | ry,r32 | — | 2 | — | — | this op not needed |
| move | r32,rz | — | — | 2 | — | this op not needed |
| addiu | rx,# | 2 | — | 5 | 8 | "addiu ry,rx,#" is extended instead |
| addiu | rx,sp,# | 5 | — | 2 | 6 | "addiu ry,rx,#" is extended instead. |

There are many variations that may be made consistent with the present invention. For example, the implementations above specifically mention the MIPS16 compressed instruction set, but systems and methods consistent with the present invention may be used with other instruction sets. Similarly, the above discussion general describes using 16-bit compressed instructions, but the present invention may be used with other size instructions and the extend instruction length may vary.

The foregoing description is presented for purposes of illustration and description. It is not exhaustive and does not limit the invention to the precise form disclosed. Modifications and variations are possible in light of the above teachings or may be acquired from practicing the invention. The scope of the invention is defined by the claims and their equivalents.

What is claimed is:

1. A method for extending registers comprising:

reading a first instruction;

determining whether the first instruction is an extend register instruction;

reading a second instruction; and combining register bits in the first instruction with register bits in the second instruction to form an extended register address when the first instruction is an extend register instruction.

2. The method of claim 1 wherein determining includes:

reading the opcode in the first instruction to determine whether the instruction is an extend register instruction.

3. The method of claim 1 wherein determining includes:

reading the opcode and additional bits in the first instruction to determine whether the instruction is an extend register instruction.

4. The method of claim 1 further including:

extracting immediate bits from the first instruction when it is determined to be a register extension instruction.

5. The method of claim 1 further including:

accessing a register using the extended register address.

6. The method of claim 1 wherein determining includes:

determining whether the extend instruction is of a first type extending a source register and a destination register.

7. The method of claim 6 wherein combining further includes:

combining source register bits in the first instruction with source register bits in the second instruction to form an extended source register address; and combining destination register bits in the first instruction with destination register bits in the second instruction to form an extended destination register address.

8. The method of claim 1 wherein determining includes:

determining whether the extend instruction is of a second type extending a first source register and a second source register.

9. The method of claim 8 wherein combining further includes:

combining first source register bits in the first instruction with first source register bits in the second instruction to form a first extended source register address; and concatenating second source register bits in the first instruction with second source register bits in the second instruction to form a second extended source register address.

10. The method of claim 1 wherein determining includes:

determining whether the extend instruction is of a third type extending a first source register, and a second source register, and providing a complete address for a destination register.

11. The method of claim 10 wherein combining further includes:

combining first source register bits in the first instruction with first source register bits in the second instruction to form a first extended source register address; and concatenating second source register bits in the first instruction with second source register bits in the second instruction to form a second extended source register address.

12. A digital signal processor comprising:

a set of addressable registers;

instruction storage providing a first and second instruction; and an instruction decoder capable of:

determining whether the first instruction is an extend register instruction, and combining bits from the first instruction with bits in the second instruction to form an extended register address.

13. The processor of claim 12, wherein the instruction decoder includes:

means for determining whether the instruction is an extend register instruction from an opcode in the first instruction.

14. The processor of claim 12 wherein the means includes:

means for determining whether the instruction is an extend register instruction from the opcode in the first instruction and additional bits in the instruction.

15. The processor of claim 12 wherein the instruction decoder includes:

means for extracting extended immediate bits from the first instruction when it is determined to be a register extension instruction.

16. The processor of claim 12 further including:

address circuitry configured to access the register in the set of registers identified by the extended register address.

17. The processor of claim 12 wherein the instruction decoder includes:

means for determining whether the extend instruction is of a first type extending a source register and a destination register.

18. The processor of claim 17 wherein the instruction decoder includes:

means for combining source register bits in the first instruction with source register bits in the second instruction to form an extended source register address; and means for combining destination register bits in the first instruction with destination register bits in the second instruction to form an extended destination register address.

19. The processor of claim 12 wherein the instruction decoder includes:

means for determining whether the extend instruction is of a second type extending a first source register and a second source register.

20. The processor of claim 19 wherein the instruction decoder includes:

means for combining first source register bits in the first instruction with first source register bits in the second instruction to form a first extended source register address; and means for concatenating second source register bits in the first instruction with second source register bits in the second instruction to form a second extended source register address.

21. The processor of claim 12 wherein the instruction decoder further includes:

means for determining whether the extend instruction is of a third type extending a first source register, a second source register and providing a complete address for a destination register.

22. The processor of claim 21 wherein the instruction decoder includes:

means for combining first source register bits in the first instruction with first source register bits in the second instruction to form a first extended register address; and means for concatenating second source register bits in the first instruction with second source register bits in the second instruction for form a second extended register address.

* * * * *